(12) United States Patent
Kim

(10) Patent No.: US 9,694,245 B2
(45) Date of Patent: Jul. 4, 2017

(54) GOLF BALL AND METHOD FOR MANUFACTURING SAME

(71) Applicant: Qingdao Fantom Golf Co., Ltd, Shandong (CN)

(72) Inventor: Ki Jung Kim, Busan (KR)

(73) Assignee: QINGDAO FANTOM GOLF CO., LTD, Shandong (CN)

(*) Notice: Subject to any disclaimer, the term of this patent is extended or adjusted under 35 U.S.C. 154(b) by 0 days.

(21) Appl. No.: 14/908,683

(22) PCT Filed: Jul. 29, 2014

(86) PCT No.: PCT/KR2014/006927
§ 371 (c)(1),
(2) Date: Jan. 29, 2016

(87) PCT Pub. No.: WO2015/016572
PCT Pub. Date: Feb. 5, 2015

(65) Prior Publication Data
US 2016/0166888 A1    Jun. 16, 2016

(30) Foreign Application Priority Data
Jul. 31, 2013   (KR) .................... 10-2013-0090555

(51) Int. Cl.
| | |
|---|---|
| A63B 37/12 | (2006.01) |
| A63B 37/00 | (2006.01) |
| C09D 7/12 | (2006.01) |
| C08L 23/08 | (2006.01) |
| C08K 5/3412 | (2006.01) |
| C08L 9/00 | (2006.01) |
| A63B 45/00 | (2006.01) |
| C08K 5/00 | (2006.01) |

(52) U.S. Cl.
CPC ........ *A63B 37/0074* (2013.01); *A63B 37/003* (2013.01); *A63B 37/005* (2013.01); *A63B 37/008* (2013.01); *A63B 37/0018* (2013.01); *A63B 37/0022* (2013.01); *A63B 37/0023* (2013.01); *A63B 37/0024* (2013.01); *A63B 37/0034* (2013.01); *A63B 37/0037* (2013.01); *A63B 37/0051* (2013.01); *A63B 37/0059* (2013.01); *A63B 37/0062* (2013.01); *A63B 37/0063* (2013.01); *A63B 37/0064* (2013.01); *A63B 37/0065* (2013.01); *A63B 45/00* (2013.01); *C08K 5/00* (2013.01); *C08K 5/3412* (2013.01); *C08L 9/00* (2013.01); *C08L 23/0876* (2013.01); *C09D 7/1233* (2013.01); *A63B 37/00* (2013.01)

(58) Field of Classification Search
CPC .............................. C08L 23/0876; C08L 9/00
See application file for complete search history.

(56) References Cited

U.S. PATENT DOCUMENTS

| | | | |
|---|---|---|---|
| 4,749,617 A | 6/1988 | Canty et al. | |
| 5,506,004 A * | 4/1996 | Maruoka | A63B 37/12 427/424 |
| 5,823,889 A * | 10/1998 | Aoyama | A63B 37/0003 473/369 |
| 5,895,105 A * | 4/1999 | Nesbitt | A63B 37/0003 473/371 |
| 6,015,356 A | 1/2000 | Sullivan | |
| 6,365,679 B1 | 4/2002 | Crast et al. | |
| 6,383,644 B2 | 5/2002 | Fuchs | |
| 6,454,667 B1 | 9/2002 | Iwanmi et al. | |
| 6,878,075 B2 | 4/2005 | Kim | |
| 7,824,739 B2 | 11/2010 | Fujisawa | |
| 8,003,176 B2 * | 8/2011 | Ylitalo | B41M 5/52 428/32.13 |
| 2004/0144224 A1 | 7/2004 | Yamakawa et al. | |
| 2006/0035724 A1* | 2/2006 | Watanabe | A63B 37/0003 473/371 |
| 2006/0189733 A1* | 8/2006 | Kennedy, III | A63B 37/0031 524/322 |
| 2010/0227945 A1 | 9/2010 | Bissinger | |
| 2011/0244983 A1 | 10/2011 | Shen | |
| 2012/0309560 A1* | 12/2012 | Sullivan | A63B 37/02 473/373 |

(Continued)

FOREIGN PATENT DOCUMENTS

| | | |
|---|---|---|
| JP | 2000-140159 | 5/2000 |
| JP | 2008-161582 | 7/2008 |
| KR | 10-1998-0070080 | 10/1998 |

(Continued)

OTHER PUBLICATIONS

Thain, Science and Golf IV (2002) ;pp. 319-327.*
Furukawa Equibinary (cis-1,4-1,2)Polybutadiene; Polymer Journal vol. 5 No. 3 (1973) pp. 231-242.*
International Search Report dated Dec. 1, 2014 for Corresponding International application No. PCT/KR2014/006927.
International Search Report dated Nov. 28, 2014 for International application No. PCT/KR2014/006925.
Menadiona Technical Data Sheet for Crosslinker CL-467, retrieved from http://onwardchem.com/pdf/Menadiona/TDS/CL-467.pdf on Mar. 13, 2017.

*Primary Examiner* — David Buttner
(74) *Attorney, Agent, or Firm* — Swanson & Bratschun, L.L.C.

(57) ABSTRACT

The present invention relates to a golf ball and a method for manufacturing same. The golf ball may include a first pole, a second pole, and a seam located between the first pole and the second pole, and a section structure including an outer surface having a plurality of dimples, a core, and a cover surrounding the core. In certain embodiments, the core includes 100 parts by weight of a butadiene rubber and 0.5 to 10 parts by weight of a polymer resin. The cover may include 100 parts by weight of an ionomer resin and 1 to 10 parts by weight of a butadiene rubber having a 1,2-bond content of 90% or more.

8 Claims, No Drawings

(56) References Cited

U.S. PATENT DOCUMENTS

2016/0166888 A1  6/2016  Kim et al.

FOREIGN PATENT DOCUMENTS

| KR | 10-0303195 | 12/2001 |
| KR | 10-2006-0016105 | 2/2006 |
| WO | WO 00/04072 | 1/2000 |

* cited by examiner

US 9,694,245 B2

GOLF BALL AND METHOD FOR MANUFACTURING SAME

RELATED APPLICATIONS

This application is a National Stage Entry of International Application No. PCT/KR2014/006927 filed on Jul. 29, 2014, and claims the benefit of Korean Application No. 10-2013-0090555, filed on Jul. 31, 2013, which are hereby incorporated by reference in its entirety for all purposes as if fully set forth herein.

TECHNICAL FIELD

The present invention relates to a golf ball and a method for manufacturing the same, and more particularly, to a golf ball having improved hitting sensation and improved flight distance, and a method for manufacturing the same, by applying an existing manufacturing process without changes even while changing the material for the golf ball or even by applying a shorted manufacturing process.

BACKGROUND ART

Golf balls are propelled in a variety of different manners such as to move long or maximum distances; to move shorter and controlled distances; for chipping or pitching or putting, etc., and different physical properties or characteristics of the ball will better assist in performing the ball's desired function. Meanwhile, many of the desired functions of the ball require contrasting physical properties or characteristics. For example, certain hardness and spin characteristics are useful to enable a golf ball to fly long distances when struck at high swing speeds by a driver. However, these same hardness and spin characteristics are less desirable for more delicate shots, like iron shots, pitch shots, and chip shots closer to the green, where more precise distance control and consistent ball reactions upon contact with the ground are desired.

As another example, personal touch sensation or hitting sensation in using a ball can be important for players. Balls made from different hardness and/or different materials may react differently when struck with different clubs. A ball designed to be removed long or maximum distances off by the driver may feel too hard or accompany an undesirable sound (e.g., a loud click or ping sound) in terms of the preferences of some players.

A soft ball that induces more spin and moves a shorter distance may prevent to move longer distances after contacting with the ground. Accordingly, selecting a ball may require players to provide any balance between requirements and desires regarding their performance and sensation.

The three major characteristics of golf balls include hitting sensation, accuracy and the flight distance, and studies have been continuously conducted to improve the balance among these characteristics.

DISCLOSURE

Technical Problem

The present inventors have continued to study on the materials of golf balls in order to solve said problems, and have found that, when a rubber material constituting a core of a golf ball is controlled to have a lower coefficient of restitution (COR) than that of rubber alone and a resin (ionomer) material constituting a cover of a golf ball is controlled to have a higher coefficient of restitution (COR) than that of rubber alone, a golf ball having a soft hitting sensation and an increased flight distance can be provided, thereby completing the present invention.

Therefore, it is an object of the present invention to provide a golf ball having a soft hitting sensation and an increased flight distance, and a method for manufacturing the same.

Technical Solution

In order to accomplish the above object, the present invention provides a golf ball comprising a first pole, a second pole, and a seam located between the first pole and the second pole, and having a section structure comprising an outer surface having a plurality of dimples formed thereon, a core, and a cover surrounding the core, wherein the core comprises a composition comprising 100 parts by weight of a butadiene rubber and 0.5 to 10 parts by weight of a polymer resin, or 100 parts by weight of an elastomeric resin, and the cover comprises 100 parts by weight of an ionomer resin and 1 to 10 parts by weight of a butadiene rubber having a 1,2-bond content of 90% or more.

The present invention also provides a method for manufacturing a golf ball, comprising the steps of: manufacturing a core; manufacturing a cover surrounding the core; grinding a mold seam on the cover; an adhesion pretreatment of the cover; a top coating; and a drying, wherein the core is prepared by a composition comprising 100 parts by weight of a butadiene rubber and 0.5 to 10 parts by weight of a polymer resin, or by 100 parts by weight of an elastomeric resin, and the cover is prepared by a composition comprising 100 parts by weight of an ionomer resin and 1 to 10 parts by weight of a butadiene rubber having a 1,2-bond content of 90% or more.

Hereinafter, the present invention will be described in detail.

In one aspect, the present invention provides a golf ball comprising a first pole, a second pole, and a seam located between the first pole and the second pole, and having a section structure comprising an outer surface having a plurality of dimples formed thereon, a core, and a cover surrounding the core, and has a technical feature of modifying each material for the core and the cover to improve the hitting sensation and the flight distance of the golf ball.

Specifically, the core may comprise a composition comprising 100 parts by weight of a butadiene rubber and 0.5 to 10 parts by weight, 1 to 5 parts by weight or 1 to 3 parts by weight of a polymer resin, or comprise 100 parts by weight of an elastomeric resin.

The butadiene rubber may be a polybutadiene rubber having a cis content of 90% or more. As a specific example, the butadiene rubber used in the present invention may be a material that commercially available under the trade name BR1208.

The polymer resin may be one or more selected from the group consisting of PET (polyethylene terephthalate), PP (polypropylene), PE (polyethylene), PVC (polyvinyl chloride), EVA (ethylene vinyl acetate) and nylon. As a specific example, it may be one or more selected from PE and EVA.

Examples of the elastomeric resin used in the present invention may include neutralized ionomers such as trade name HPF 1000, HPF 2000, etc., available from DuPont, common ionomers such as trade name Surlyn series 8940, 9910, 8660 and 9320, etc., available from DuPont.

As another example, the core may have a two-layer core structure of a central core and an outer core. The central core comprises 100 parts by weight of an elastomeric resin, and the outer core comprises a composition comprising 100 parts by weight of the butadiene rubber and 0.5 to 10 parts by weight, 1 to 5 parts by weight or 1 to 3 parts by weight of a polymer resin, which surrounds the central core.

The core may include conventional additives. Examples of such additives include curing accelerators, curing agents, liquid phenolic resin plasticizers, anti-degradants, antioxidants, peroxide crosslinking agents, ducumyl peroxide crosslinking agents, fillers (precipitated hydrated silica, clay, talc, asbestos, glass, aramid fibers, mica, calcium metasilicate, barium sulfate, zinc sulfide, lithopone, silicon carbide, silicates, diatomaceous earth, carbonates, metals, metal alloys, metal oxides, metal stearates, particulate carbonaceous materials, cotton flock, cellulose flock, leather fiber, micro balloons, etc.), and the like.

Due to such modification, the compressive strength of the core may be in the range of 40 to 70 PGA, 44.6 to 50.5 PGA, or 45 to 50 PGA.

The diameter of the core may be in the range of 38 to 41 mm, or 39 to 40 mm.

The difference in Shore D hardness (Cs-Cc) between the outermost surface (Cs) and center (Cc) of the core, may be in the range of 8 to 15, 10 to 14, 11 to 13, or 12 to 12.5.

As a specific example, the cover comprises a composition comprising 100 parts by weight of the ionomer resin, and 1 to 10 parts by weight of a butadiene rubber having a 1,2-content of 90% or more.

The ionomer resin may be, for example, one or more selected from the group consisting of a hard ionomer which is a magnesium, lithium, sodium or zinc salt of a copolymer of a $C_2$-$C_8$ olefin with a $C_3$-$C_8$ unsaturated monocarboxylic acid and has a modulus of 30,000 to 55,000 P.S.I., and a soft ionomer which is a magnesium, lithium, sodium or zinc salt of a copolymer of a $C_2$-$C_8$ olefin with a $C_2$-$C_{22}$ acrylate ester-based unsaturated monomer and has a modulus of 3,000 to 7,000 P.S.I.

As a specific example, the ionomer resin may be one or more selected from the group consisting of a hard ionomer which is a magnesium, lithium, sodium or zinc salt of a copolymer of ethylene with methacrylic acid, and a soft ionomer which is a sodium salt of a terpolymer of n-butyl acylate or iso-butyl acrylate, ethylene and methacrylic acid. As another example, the ionomer resin may be trade name Surlyn series available from DuPont.

The butadiene rubber having a 1,2-content of 90% or more may be the trade name RB3810, etc.

The cover may include conventional additives, for example, a white pigment such as $TiO_2$.

The coefficient of restitution (COR; 40 m/s) of the cover may be at least 0.770, in the range of 0.790 to 0.810, or in the range of 0.795 to 0.805.

The compressive strength (COMP') of the cover may be, for example, in the range of 50 to 90 PGA, 50 to 70 PGA, 50 to 65 PGA, 58 to 65 PGA, or 59.3 to 61.2 PGA.

Furthermore, a shell layer may be sandwiched between the core and the cover. In other words, the gold ball according to the present invention may comprise a core, the shell layer surrounding the core, and a cover surrounding the shell layer. The material, thickness and shape of the outer layer are not specifically limited, as long as they are those that are generally used in this arts.

The total number of dimples formed onto the surface of the golf ball according to the present invention may be, for example, 220 to 450, 220 to 432, 300 to 430, or 300 to 350. In addition, the dimples may have various shapes that are generally applied in this arts.

The golf ball of the present invention may have a diameter in the range of 41 to 44 mm, 42 to 43 mm, or 42.67 to 42.90 mm.

The golf ball of the present invention may be coated with at least one coating resin selected from one-component/two-component urethane resins, one-component/two-component acrylic urethane resins, and PVC resins, to have a coating thickness of 5 to 40 μm, 10 to 30 μm, or 10 to 25 μm.

The golf ball of the present invention may be coated with a top coating composition comprising 100 parts by weight of the coating resin and 1 to 3.5 parts by weight, or 2 to 3 parts by weight of a compound represented by the following formula 1:

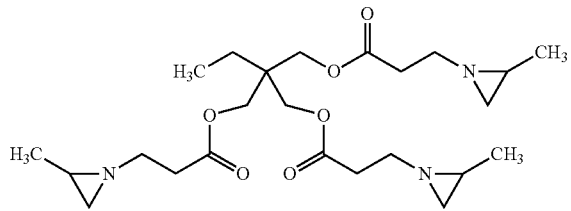

Formula 1

Further, the coating resin may comprise a pigment component that is generally used. For example, the coating resin may comprise at least one pigment selected from the group consisting of titanium dioxide, barium sulfide, zinc oxide and zinc sulfide, in an amount of 1 to 10 parts by weight, or 1 to 5 parts by weight, based on 100 parts by weight of the coating resin.

The golf ball of the present invention may be manufactured by, but not limited to a method comprising the steps of: manufacturing a core; manufacturing a cover surrounding the core; grinding a mold seam of the cover; an adhesion pretreatment of the cover; a top coating; and a drying, wherein the core is prepared by a composition comprising 100 parts by weight of a butadiene rubber and 0.5 to 10 parts by weight of a polymer resin, or 100 parts by weight of an elastomeric polymer, and the cover is prepared by a composition comprising 100 parts by weight of an ionomer resin and 1 to 10 parts by weight of a butadiene rubber having a 1,2-bond content of 90% or more.

The step of manufacturing the core may be performed according to any conventional method, for example, compression molding, injection molding, or casting, etc.

Further, a step of a marking may be performed according to any conventional method, prior to the step of a top coating.

In addition, in the step of manufacturing the cover, one to four cover over-layers may be overlapped around the core to provide two-piece to five-piece golf balls. Further, the outermost cover may be manufactured to have dimples having various shapes.

Moreover, the step of manufacturing the cover may further comprise a step of manufacturing a shell layer surrounding the core, and a step of manufacturing a cover surrounding the shell layer. Specific components and processes that are used in the step of the shell layer are not specifically limited, as long as they are those that are generally used.

The step of the top coating may be performed according to any conventional method. For example, the step of the top coating may be performed by air-spray coating, electrostatic coating, or the like.

The step of the drying may also be performed according to a conventional method. For example, it may be performed by thermal drying, near infrared (NIR) drying, or hot-air drying.

For reference, the step of manufacturing the core, the step of manufacturing the cover surrounding the core, the step of grinding the mold seam of the cover, the step of the adhesion pretreatment of the cover, the step of the label marking, the step of the top coating, and the step of the drying, are not specifically limited and may be performed using conventional methods in this arts.

The use of the composition comprising the compound of formula 1, prior to the step of the top coating, may provide advantages in that the step of the adhesion pretreatment of the cover may be omitted and the adhesion property of the composition can be improved. For reference, upon application of the compound of the above formula 1 into the coating composition, the compound of the above formula 1 has a role of cleaving the branched chain carboxyl group (—COOH) of the ionomer resin constituting the cover, thereby exhibiting the effect of producing active sites for molecular bonding with the coating resin onto the surface of the ionomer resin.

Other compounds may be used instead of the compound of formula 1, for examples include ethyleneimine-based crosslinker, including trade name CL-422 and CL-427, available from Menadiona S. A. (Europe); propyleneimine-based crosslinker, including trade name CL-467, XAMA-2, XAMA-7 and XAMA-220, available from Menadiona S. A.; and blocked aziridine crosslinkers, including trade name POLY-U25 available from Menadiona S. A., and trade name SU-125F available from Meisei, Japan.

Advantageous Effects

According to the present invention, a golf ball having an improved hitting sensation and an increased flight distance can be provided by applying an existing manufacturing process without changes even while changing the material for the golf ball or even by applying a shorted manufacturing process.

MODE FOR INVENTION

Hereinafter, preferred examples will be presented for a better understanding of the present invention. It is to be understood, however, that these examples are for illustrative purposes only and are not intended to limit the scope of the present invention.

The components used in the following examples and comparative examples are as follows.

1) Core of the golf ball: 100 parts by weight of butadiene rubber (trade name BR1208)+1.5 parts by weight of EVA;

2) Resin for cover of the golf ball: 95 parts by weight of ionomer (including trade name Surlyn series 8940, 9910, 8660 and 9320, manufactured by DuPont)+5 parts by weight of trade name RB810 (butadiene rubber having a 1,2 bond content of 90% or more);

3) Core additives: ZDA (zinc diacrylate curing agent), ZnSt (zinc stearate; lubricant), DCP (dicumyl peroxide; crosslinking agent), and antioxidant.

EXAMPLES 1 AND 2

From the above components, a golf ball having a core, a cover and dimples was manufactured according to the mixing ratio shown in below Table 1.

TABLE 1

| | Core | Cover | Number of dimples |
|---|---|---|---|
| Example 1 | 100 parts by weight of BR1208 + 25 parts by weight of ZDA + 25 parts by weight of ZnO + 5 pasts by weight of ZnSt + 1.0 part by weight of DCP + 0.5 parts by weight of antioxidant + 5.0 parts by weight of EVA | Surlyn ionomer (65 parts by weight of 8940 + 30 parts by weight of 9910) + 5 parts by weight of RB810) + 3 parts by weight of $TiO_2$ | 312 |
| Example 2 | 100 parts by weight of BR1208 + 30 parts by weight of ZDA + 25 parts by weight of ZnO + 5 parts by weight of ZnSt + 1.0 part by weight of DCP + 0.5 parts by weight of antioxidant + 5.0 parts by weight of EVA | Surlyn ionomer (65 parts by weight of 8940 + 30 parts by weight of 9910 + 5 parts by weight of RB810) + 3 parts by weight of $TiO_2$ | 312 |

The properties regarding the cores were measured, and the results of the measurement are shown in below Table 2.

The properties were measured in the following manner.

Size (mm): The distance between the first pole and the second pole, and two types of seams, were measured, and then the measurements were averaged.

Compressive strength (COMP', unit: PGA) : When a test sample was compressed to 2.5 mm, a pressure measured by a compression sensor located under the pressing location of the ball was read. The unit is generally $kgf/cm^2$.

Shore D hardness: Shore D hardness was measured in accordance with ASTM D2240. In addition, JIS-C hardness as Japan measurement method was also measured.

TABLE 2

| | Diameter mm | COMP PGA | Weight g | | Hardness | | |
|---|---|---|---|---|---|---|---|
| | | | | | Center (Cc) | Surface (Cs) | Cs-Cc |
| Example 1 | 39.90 | 44.6 | 38.36 | Shore D | 30.9 | 43.0 | 12.1 |
| | | | | JIS-C | 53.8 | 72.6 | 18.8 |
| Example 2 | 39.90 | 50.5 | 38.43 | Shore-D | 32.9 | 45.3 | 12.4 |
| | | | | JIS-C | 54.0 | 75.1 | 21.1 |

As can be seen in the above Table 2, the cores manufactured in Examples 1 and 2 had a size in the range of 38.0 to 41.0 mm, a compressive strength (COMP') in the range of 40 to 70 PGA, and the difference in Shore D hardness, (Cs-Cc) between the outermost surface (Cs) and center (Cc) of the core, in the range of 8 to 15.

Next, a cover material was once injection-molded around the core to form a one-layer cover, and then the seam of the cover was grinded, Thereby preparing a two-piece golf ball.

The two-piece golf ball was coated with a one-component water-soluble TPU (thermoplastic urethane) primer paint by air spray, and then irradiated with near infrared (NIR) light, after which it was coated with a two-component solvent type TPU (thermoplastic urethane) clear paint, thereby manufacturing a golf ball comprising a coating layer having a thickness of about 20 μm.

The properties of the golf balls were measured in the same manner as described in the above Table 2, and the results of the measurement are shown in below Table 3. For reference, the coefficient of restitution (C.O.R) was calculated as the ratio from the flight velocity and the rebound speed, when the golf ball was collided against a wall at a distance of 1 m at a velocity of 90 mph.

TABLE 3

|  | Size mm | COMP PGA | Weight g | Hardness Shore D | Hardness JIS-C | Coefficient of restitution (C.O.R.) |
|---|---|---|---|---|---|---|
| Example 1 | 42.83 | 59.3 | 45.49 | 65.3 | 95.0 | 0.8068 |
| Example 2 | 42.81 | 61.2 | 45.65 | 60.5 | 91.7 | 0.8001 |

As can be seen in the above Table 3, the golf balls finally manufactured in Examples 1 and 2 had a size in the range of 41 to 44 mm, a compressive strength (COMP') in the range of 5 to 62 PGA, and a coefficient of restitution (C.O.R) of 0.8000 or more.

COMPARATIVE EXAMPLES 1 TO 4

Four different commercial golf balls were prepared, and the properties of the golf balls were measured in the same manner as described in the above Table 3. The results of the measurement are shown in below Table 4.

For reference, Titleist ProV1, Srixon Q-STAR (2-piece), Bridgestone ALTUS (2-piece) and Callaway HEX Diablo golf balls were used as Comparative Examples 1 to 4, respectively.

TABLE 4

|  | Size mm | COMP PGA | Weight g | Hardness Shore D | Coefficient of restitution (C.O.R.) |
|---|---|---|---|---|---|
| Comparative Example 1 | 42.71 | 96.3 | 45.62 | 57 | 0.7989 |
| Comparative Example 2 | 42.72 | 87.6 | 45.60 | 62 | 0.7844 |
| Comparative Example 3 | 42.68 | 75.0 | 45.50 | 63 | 0.7868 |
| Comparative Example 4 | 42.83 | 70.0 | 45.38 | 64 | 0.7898 |

As can be seen in the above Table 4, the golf balls of Comparative Examples 1 to 4 had a compressive strength of 70 PGA, which was higher than those of Examples 1 to 2 (ranging from 55 to 62 PGA), and a coefficient of restitution (C.O.R) in the range of 0.7868 to 0.7989, which was lower than those of Examples 1 to 2 (ranging from 0.8000 or more).

TEST EXAMPLE

Tests regarding the flight distance of each golf balls in Examples 1 and 2 and Comparative Examples 1 to 4 were performed, and the results of the tests are summarized in below Table 5.

TABLE 5

|  | Club speed mph | Ball speed mph | Spin rate rpm | Height yards | Flight yards | Flight time sec | Total yards |
|---|---|---|---|---|---|---|---|
| Example 1 | 93.2 | 139.6 | 2375.1 | 32.5 | 211.3 | 6.4 | 225.6 |
| Example 2 | 93.2 | 139.4 | 2446.6 | 31.3 | 211.7 | 6.4 | 225.8 |
| Comparative Example 1 | 93.2 | 139.5 | 2863.8 | 33.8 | 212.7 | 6.7 | 223.0 |
| Comparative Example 2 | 93.2 | 139.3 | 2679.0 | 32.1 | 211.5 | 6.6 | 224.4 |
| Comparative Example 3 | 93.2 | 139.9 | 2829.4 | 32.0 | 211.3 | 6.6 | 224.4 |
| Comparative Example 4 | 93.2 | 139.7 | 2618.0 | 31.8 | 211.6 | 6.5 | 225.0 |

As can be seen in the above Table 5, the golf balls of Examples 1 and 2 were much superior to the commercial golf balls of Comparative Examples 1 to 4 in terms of the spin rate (advantageous for a long flight distance with lower back spin in driver shot) among the test items measured under similar club speed and ball speed conditions. In addition, it could be seen that the golf balls of Examples 1 and 2 were suitable in terms of height, landing angle and flight time, and excellent in terms of total distance of flight distance plus roll distance.

The invention claimed is:

1. A golf ball comprising an outer surface having a plurality of dimples formed thereon, a core, and a cover surrounding the core,
   wherein the core comprises a composition comprising 100 parts by weight of a butadiene rubber and 0.5 to 10 parts by weight of a polymer resin, or 100 parts by weight of one or more selected from neutralized ionomers and commercial ionomers, and the cover comprises 100 parts by weight of an ionomer resin and 1 to 10 parts by weight of a butadiene rubber having a 1,2-bond content of 90% or more,
   wherein the golf ball is coated with at least one coating resin selected from the group consisting of one-component/two-component urethane resins, one-component/two-component acrylic urethane reins, and PVC resins, to a coating thickness in the range of 5 to 40 μm and
   wherein the golf ball is coated with a top coating composition comprising 100 parts by weight of the coating resin and 1 to 3.5 parts by weight of a compound represented by the following formula 1:

Formula 1

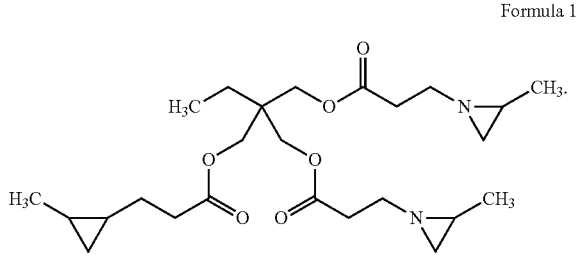 [SMILES: CCC(COC(=O)CCC1CC1C)(COC(=O)CCN1CC1C)COC(=O)CCN1CC1C]

2. The golf ball of claim 1, wherein a difference in Shore D hardness (Cs-Cc), between an outermost surface (Cs) and a center (Cc) of the core is in the range of 8 to 15.

3. The golf ball of claim 1, wherein the polymer resin is one or more selected from the group of consisting of PET(polyethylene terephthalate), PP(polypropylene), PE(polyethylene), PVC(polyvinyl chloride), EVA(ethylene vinyl acetate) and nylon.

4. The golf ball of claim 1, wherein the core has a compression in the range of 40 to 70 PGA.

5. The golf ball of claim 1, wherein the core has a diameter in the range of 38.0 to 41.0 mm.

6. The golf ball of claim 1, wherein the ionomer resin is one or more selected from the group consisting of a hard ionomer which is a magnesium, lithium, sodium or zinc salt of a copolymer of a $C_2$-$C_8$ olefin with a $C_3$-$C_8$ unsaturated monocarboxylic acid and has a modulus of 30,000 to 55,000 P.S.I., and a soft ionomer which is a magnesium, lithium, sodium or zinc salt of a copolymer of a $C_2$-$C_8$ olefin with a $C_2$-$C_{22}$ acrylate ester-based unsaturated monomer and has a modulus of 3,000 to 7,000 P.S.I.

7. The golf ball of claim 1, wherein the ionomer resin is one or more selected from the group consisting of a hard ionomer which is a magnesium, lithium, sodium or zinc salt of a copolymer of ethylene with methacrylic acid, and a soft ionomer which is a sodium salt of a terpolymer of n-butyl or iso-butyl acrylate, ethylene and methacrylic acid.

8. The golf ball of claim 1, wherein the coating resin comprises 1 to 10 parts by weight of at least one pigment selected from the group consisting of titanium dioxide, barium sulfide, zinc oxide and zinc sulfide, based on 100 parts by weight of the coating resin.

\* \* \* \* \*